June 5, 1962 R. M. FRANZEL ETAL 3,037,385
FLUID QUANTITY MEASURING APPARATUS
Filed Dec. 11, 1950
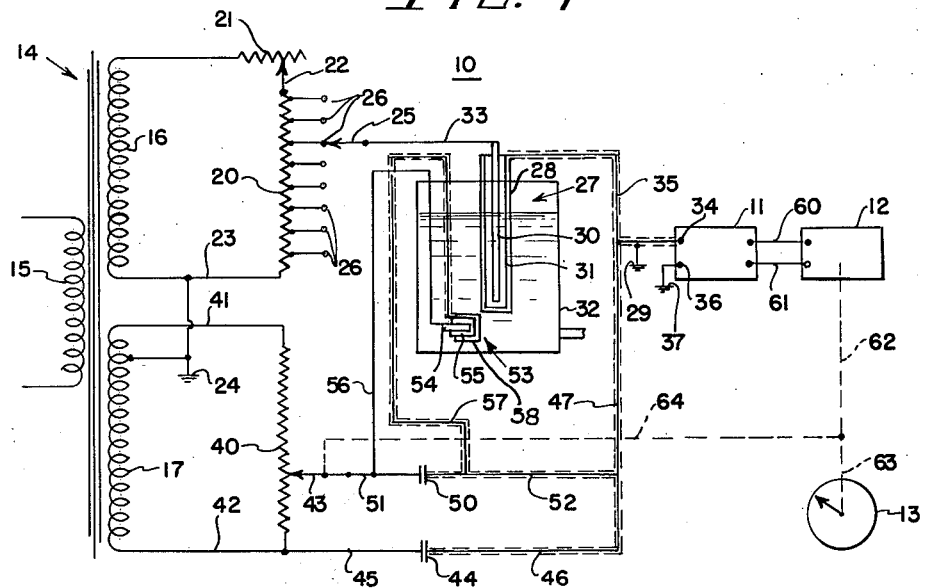
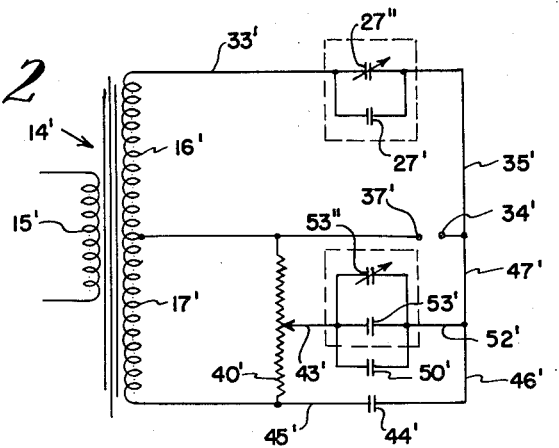
INVENTORS
RICHARD M. FRANZEL
ALBERT C. SMITH
BY
George H Fisher
ATTORNEY

United States Patent Office 3,037,385
Patented June 5, 1962

3,037,385
FLUID QUANTITY MEASURING APPARATUS
Richard M. Franzel, Edina, and Albert C. Smith, Minneapolis, Minn., assignors to Minneapolis-Honeywell Regulator Company, Minneapolis, Minn., a corporation of Delaware
Filed Dec. 11, 1950, Ser. No. 200,258
16 Claims. (Cl. 73—304)

This invention is primarily concerned with fuel measuring apparatus and particularly with that type of apparatus for measuring the weight of fuel by the use of capacitors.

In the capacitor type of fuel measuring apparatus a capacitor, commonly called a tank unit, is positioned vertically in the tank containing the fuel. The capacitance of the tank unit varies with variation of the height of the fuel in the tank because the dielectric constant of the fuel is approximately twice that of air, which it replaces. If the density and the dielectric constant of the fuel are known the dial which indicates the amount of fuel can be calibrated in pounds, which is an advantage because engines consume fuel by B.t.u., which is more closely allied to pounds, rather than to volume, to obtain power.

Differences in dielectric constants for various types of fuels and even for a given fuel at different temperatures are generally not the same proportionately as the differences in density for the same types of fuel or for different temperatures of a given fuel. For this reason the accuracy of even the best capacitor type fuel measuring apparatus hitherto known in the art is subject to errors which can amount to incorrect readings of as much as two percent and more measurement on the dial.

It is therefore an object of this invention to provide a new and improved capacitor type fuel measuring apparatus.

A further object of the invention is to provide a capacitor type fuel measuring apparatus which compensates for changes of dielectric constant from an assumed value of the fuel being measured.

A further object of the invention is to provide a capacitor type fuel measuring apparatus which compensates for changes in dielectric constant and changes in density of the fuel being measured.

A further object of the invention is to provide a capacitor type fuel measuring apparatus which can be calibrated for measuring the weight of a fuel having a particular dielectric constant and density and be used to measure the weight of other fuels having different dielectric constants and densities without being recalibrated.

A further object of the invention is to provide a capacitor type fuel measuring apparatus which accurately measures the weight of fuel over a wide range of temperatures.

Briefly, the invention largely resides in placing a second tank unit in the fuel tank near the bottom of the tank in a horizontal position so as to be continually immersed in the fuel. This second, or compensator, tank unit is electrically connected into the apparatus to tend to neutralize the effect upon the primary, or measuring, tank unit, the capacitance of which is affected by the height and dielectric constant of the fuel, of changes in dielectric constant of the fuel as is described hereinafter.

For a better understanding of the invention and to determine how the above and other objects and advantages are accomplished reference is had to the following detailed description taken in conjunction with the accompanying drawings, in which:

FIGURE 1 shows one form of apparatus utilizing the invention; and

FIGURE 2 is a simplified diagram of a portion of the apparatus showing one manner of utilizing the invention.

In the apparatus shown in FIGURE 1, a network 10 energizes an amplifier 11 to control the operation of a reversible motor 12. Operation of motor 12 results in movement of a needle along an indicator dial 13 and further rebalances the network 10.

The network 10 is energized by a transformer 14 having a primary 15 and two secondaries 16 and 17. A tapped resistor 20 is connected across the transformer secondary 16 through a variable resistor 21 having a wiper arm 22 cooperating therewith. The wiper arm 22 is shown to be connected to the upper end of tapped resistor 20. The lower terminal of the tapped resistor 20 is connected to the lower terminal of transformer secondary 16 by a conductor 23, which is further connected to ground terminal 24. A wiper arm 25 makes connection with taps 26 on tapped resistor 20. A tank unit or measuring capacitor 27 having an inner electrode 30, an outer electrode 31 and a shield 28 is placed in a tank 32 containing fuel, the weight of which is to be measured. The inner electrode 30 of the tank unit 27 is shown to be connected to wiper arm 25 through a conductor 33 while the outer electrode 31 is connected to an input terminal 34 of amplifier 11 through a shielded conductor 35. Shield 28 is connected to the shielding of conductor 35 and is connected to ground terminal 29. The other input terminal 36 of amplifier 11 is connected to ground terminal 37.

The lower transformer secondary 17 is connected to ground terminal 24 near the upper end of the secondary. A potentiometer 40 is connected across transformer secondary 17 by conductors 41 and 42. Potentiometer 40 has a wiper arm 43 moving in cooperation therewith. A capacitor 44, functioning as an empty tank reference capacitor, is connected to the lower terminal of transformer secondary 17 through conductors 42 and 45. The other terminal of capacitor 44 is connected to the input terminal 34 of amplifier 11 through conductors 46 and 47. Wiper arm 43 is connected to one terminal of a capacitor 50 through a conductor 51, capacitor 50 is used for rebalancing at least a portion of the measuring signal from unit 27 and thus is considered a measuring reference capacitor. The other terminal of capacitor 50 is connected to input terminal 34 of amplifier 11 through conductors 52 and 47.

A second tank unit or dielectric constant compensating capacitor 53 having an inner electrode 54, outer electrode 55 and shield 58 is connected in parallel with capacitor 50 by conductors 56 and 57.

The output signal from the bridge is taken from between terminal 34 on amplifier 11 and ground terminal 24 and is determined by a comparison of the voltage across tank unit 27 and impedance of the tank unit with the voltages across capacitors 44 and 50 and tank unit 53 and the impedances of the capacitors and tank unit. When the network is in balance the voltage across tank unit 27 multiplied by the capacitance of the tank unit is balanced out by the sum of the voltages across the capacitors and tank unit 53 multiplied by their capacitances.

Amplifier 11 energizes motor 12 through conductors 60 and 61. Amplifier 11 may be of the type having a phase discriminator as its power or output stage so that a reversible input signal to the amplifier is reflected in the output circuit. The motor may be of the split phase type having two windings, one of which, called the power winding, is connected in series with a capacitor to the source of power, with the other or signal winding connected to the output of the amplifier. A capacitor is connected across the signal winding. The windings are displaced in time phase due to the action of the capacitor in series with the power winding so that the phase of the current through the signal winding determines the direction of rotation of the motor. An amplifier and motor combination as just described and which may be used satisfactorily in this apparatus is shown and described in a patent to Upton, 2,423,534, assigned to the same assignee as the present invention.

Motor 12 has a mechanical output connection 62 which moves the needle on dial 13 through mechanical connection 63. Motor 12 also moves wiper arm 43 through mechanical connections 62 and 64 to rebalance the network 10.

The operation of the network 10 can perhaps be better understood by an examination of FIGURE 2. In FIGURE 2 a transformer 14' has a primary 15' and a secondary divided into an upper portion 16' and a lower portion 17'. The tank unit is divided schematically into a fixed capacitor 27' and a variable capacitor 27", connected in parallel. One terminal of each of the two capacitors is connected to the upper terminal of secondary portion 16' through a conductor 33' while the other terminals of the two capacitors are connected to an output terminal 34' of the network through a conductor 35'.

A resistor 40' is connected across transformer secondary portion 17'. The two transformer secondary portions 16' and 17' are connected together with the common terminal connected to an output terminal 37'. The lower terminal of transformer secondary 17' is connected to a capacitor 44' through a conductor 45'. The other terminal of capacitor 44' is connected to output terminal 34' of the network through conductors 46' and 47'. A wiper arm 43' operating along resistor 40' is connected to one terminal of a fixed capacitor 50' with the other terminal of this capacitor being connected to the output terminal 34' through conductors 52' and 47'.

The second tank unit is schematically divided into two capacitors one of which is a fixed capacitor 53' and the other of which is a variable capacitor 53". This tank unit, comprising the two capacitors 53' and 53", is connected in parallel with capacitor 50'.

Fixed capacitor 27' represents the empty tank capacitance value of the tank unit 27 while the variable capacitor 27" represents the capacitance value of the tank unit according to the height of the fuel in the tank.

The operation of the network can be most simply explained by showing how the voltages multiplied by the capacitances in the upper half of the network equal the voltages multiplied by the capacitances in the lower half of the network when the network is at balance. Let:

$E_1$ = voltage across capacitors 27' and 27";
$E_2$ = voltage across capacitor 44';
$E_3$ = voltage across capacitors 50', 53' and 53";
$C_{27'}$ = capacitance of capacitor 27';
$C_{27''}$ = capacitance of capacitor 27";
$C_{44'}$ = capacitance of capacitor 44';
$C_{50'}$ = capacitance of capacitor 50';
$C_{53'}$ = capacitance of capacitor 53';
$C_{53''}$ = capacitance of capacitor 53".

Then when the network is balanced:

$$E_1 C_{27'} + E_1 C_{27''} = E_2 C_{44'} + E_3 C_{50'} + E_3 C_{53'} + E_3 C_{53''}$$

As $C_{27'}$ is the empty tank capacitance of tank unit 27 and the signal due to capacitor $C_{44'}$ balances out the empty tank signal of tank unit 27, $$E_1 C_{27'} = E_2 C_{44'}$$

It should be noticed that in order for this relationship to hold true it is not necessary for $E_1$ to be equal to $E_2$ nor for $C_{27'}$ to be equal to $C_{44'}$.

With $$E_1 C_{27'} = E_2 C_{44'}$$

then $$E_1 C_{27''} = E_3 C_{50'} + E_3 C_{53'} + E_3 C_{53''}$$

Now $E_1$ is fixed as are $C_{50'}$ and $C_{53'}$. $C_{53''}$ is also constant as long as the dielectric constant remains fixed. Therefore, when $C_{27''}$ varies it is necessary for $E_3$ to vary in order that the relationship continues to hold true. $E_3$ is varied by the operation of motor 12 on wiper arm 43 to rebalance the network upon $C_{27''}$ being varied by changing the amount of fuel in the tank.

From the above explanation it is apparent that the effect of the compensating capacitor 53 varies with rise and fall of the fuel in the tank even though the capacitor is completely immersed in the fuel as long as there is a measurable amount of fuel in the tank. The capacitance of the capacitor remains constant for the particular fuel and at the particular temperature but the voltage across the capacitor is varied for change in the amount of fuel to vary the effect of the capacitor in the network. Thus the ratio between the capacitors 50 and 53 remains constant for a particular fuel and a particular temperature for the entire range of the amount of fuel from empty to full.

If the fuel in the tank is subjected to a new temperature or if a different fuel is placed in the tank the dielectric constant changes, changing the capacitance of the compensator capacitor 53. This results in a new ratio between capacitors 50 and 53, which ratio then remains constant for all amounts of fuel in the tank.

The apparatus is calibrated by emptying the tank 32 of fuel, moving wiper arm 43 along resistor 40 until the voltage between wiper arm 43 and ground terminal 24 is zero and then moving wiper arm 25 along the taps on resistor 20 until the output signal at terminals 34 and 36 is very small. The wiper arm 22 is then moved along variable resistor 21 until the output voltage from the bridge becomes zero. At this time the needle on dial 13 is to indicate no fuel in the tank and the dial scale is marked or shifted accordingly.

To calibrate the network for a full tank of fuel, the tank is filled with fuel and the wiper arm 43 moved downwardly along resistor 40 until the signal at terminals 34 and 36 is again zero. At this time the needle on the dial 13 is to indicate a full tank of fuel and the dial scale is marked accordingly. Knowing the weight of the fuel in the tank the dial can then be calibrated over its length in units of weight of the fuel. It is an advantage to calibrate the dial in pounds rather than in cubic feet of fuel because, as previously mentioned, engines obtain horsepower through using pounds of fuel rather than through using cubic feet of fuel.

When the apparatus is once calibrated for a given fuel it is highly accurate for most other types of fuel or for different temperatures of the same fuel.

The amount of correction for a change in dielectric constant with change in density of the fuel is controlled by the values given to tank unit 53 and capacitor 50. If capacitor 50' plus capacitor 53' equals capacitors 53" and the dielectric constant is equal to 2, the correction will be 50 percent. This may occur when capacitor 50' is zero. As less and less correction is desired, of course, the capacitor 50 is made to have greater and greater finite values.

If it is assumed, for example, that an assumed value of the dielectric constant of the fuel is 2.0 and the assumed value of the density is 6.0 pounds per cubic foot and the actual dielectric constant of the fuel being used is 2.1 and the density is 6.3 pounds per cubic foot, the desired correction would be 50 percent. This is because the dielectric constant of air is 1.0 and therefore the effective dielectric constant of the capacitor 27" would be 1.1 (2.1 minus 1.0) or a change of 10 percent from the assumed value. The change in density of the fuel is only 5 percent $$\left(\frac{6.3 - 6.0}{6.0} \times 100\right)$$

If capacitor 50 and the tank unit 53 are given predetermined calculated values for the assumed characteristics of the fuel, the correction can be made 50 percent of the 10 percent change in dielectric constant, or 5 percent, which is the change in density of the fuel. Then the dial 13 would be substantially accurate for this new fuel.

If the dielectric constant should vary from the assumed value by 10 percent while the density varies from the assumed value by 6 percent and the correction of the circuit is 50 percent there would be an error of one percent. The effect of the variation of the dielectric constant would be halved to 5 percent, which would differ from the 6 percent variation of the density from its assumed value by one percent. If there were no correction, however, there would be an error of 4 percent (10 percent minus 6 percent).

If the density were to vary from the assumed value by only 4 percent while the dielectric constant varies by 10 percent there would again be a one percent error reading on the indicator dial with this circuit while there would be a 6 percent dial error using an uncompensated circuit.

It is thus seen that apparatus has been provided in which changes in dielectric constant of a fuel are not the same percentagewise as the changes in density have been compensated for to provide more accurate indication of the weight of the fuel in the tank.

As modifications may be made within the spirit of the invention by those skilled in the art it is to be understood that this invention is to be limited only to the extent of the appended claims.

We claim:

1. Measuring apparatus for dielectric fluid comprising; capacitor type measuring means having spaced electrodes and arranged to be positioned in a tank of dielectric fluid, the capacitance value of said measuring means being a function of the amount of fluid between said spaced electrodes and the dielectric constant of the fluid, a source of constant magnitude alternating potential, means connecting said measuring means to said source of constant potential in a manner to obtain a signal of a first phase; an empty tank reference impedance, means connecting said reference impedance to said source of constant potential in a manner to obtain a first signal of a second phase equal in magnitude to that portion of said signal of said first phase which is due to the capacitance value of said measuring means when no fluid is between said spaced electrodes; a dielectric compensation capacitor having spaced electrodes and arranged to be positioned with the fluid being measured between its spaced electrodes at all times, the capacitance value of said compensation capacitor being a function of the dielectric constant of the fluid, a source of variable magnitude alternating potential, means connecting said compensation capacitor to said source of variable potential to obtain a second signal of said second phase; signal responsive means connected to said measuring means, said empty tank reference impedance, and said compensation capacitor, said signal responsive means having said signals impressed thereon to obtain a resultant signal; indicating means, means connecting said indicating means to said signal responsive means; and means connecting said signal responsive means to said source of variable magnitude alternating potential to vary the potential to said dielectric compensation capacitor to vary the second signal of said second phase and tend to reduce said resultant signal substantially to zero.

2. Measuring apparatus for dielectric fluids comprising; capacitor type measuring means having spaced electrodes and arranged to be positioned in a tank of dielectric fluid, the capacitance value of said measuring means being a function of the amount of fluid between said electrodes and the dielectric constant of the fluid; a source of constant magnitude alternating potential, means connecting said measuring means to said source of constant potential in a manner to obtain a signal of a first phase; an empty tank reference impedance, means connecting said empty tank reference impedance to said source of constant potential in a manner to obtain a first signal of a second phase equal in magnitude to that portion of the signal of said first phase indicative of an empty tank; a dielectric compensation capacitor having spaced electrodes and arranged to be positioned so that the dielectric fluid at all times fills the space between its electrodes, the capacitance value of said compensation capacitor being a function of the dielectric constant of the fluid; a measuring reference impedance, a source of variable magnitude alternating potential, means connecting said compensation capacitor and said measuring reference impedance to said source of variable potential in a manner to obtain a second signal of said second phase, signal responsive means connected to said measuring capacitor means, said empty tank reference impedance, said measuring reference impedance and said compensation capacitor, to impress a signal on said signal responsive means which is a function of said signal of said first phase and said first and second signals of said second phase; and means connecting said signal responsive means to said source of variable magnitude alternating potential to vary the potential to said compensation capacitor and said measuring reference impedance to tend to reduce said resultant signal to zero.

3. Capacitance type fluid measuring apparatus for indicating the mass of fluid in a container, the dielectric constant of the fluid being representative within predetermined tolerable limits of the density of the same fluid within the range of fluids to be measured, comprising in combination: a measuring condenser having spaced electrodes immersible in the fluid in the container and constructed and arranged with respect to said container such that its capacity is a function of both the volume and dielectric constant of the fluid in the container; an empty tank balancing condenser; a reference condenser having a normally fixed capacity; an auxiliary condenser having electrodes constructed and arranged for substantially complete immersion in a representative sample of the fluid such that its capacity is a function of the dielectric constant of the fluid in the container; a first source of alternating voltage of constant magnitude; circuit means connecting said measuring condenser to said first source of alternating voltage for producing a current of a first phase which is a function of the capacity of said measuring condenser; a second source of alternating voltage of constant magnitude and of a phase opposite to said first source; circuit means connecting said empty tank balancing condenser to said second source of alternating voltage for producing a current substantially opposite in phase to said current of said first phase and of a magnitude equal to the current flowing through said measuring condenser when empty of fluid; a source of alternating voltage of a variable magnitude and of a phase opposite to said first source; circuit means connecting said reference condenser to said variable source of alternating voltage for producing a first component of variable current, substantially opposite in phase to said current of said first phase, and proportional to the magnitude of said variable source of voltage; circuit means connecting said auxiliary condenser in parallel with said reference condenser for providing a second component of variable current substantially in phase with said first variable component and proportional to both the magnitude of said variable source of voltage and to the capacitance value of said auxiliary condenser; means connected between a first output point common to said voltage sources and a second output point common to said measuring condenser, said empty tank balancing condenser, said reference condenser and said auxiliary condenser and responsive to any output voltage resulting from the current of said first phase and the currents of said opposite phase for adjusting the magnitude of said variable source of voltage in a direction to reduce said output voltage to zero; and means responsive to the adjustment of said variable source of voltage for indicating the mass of fluid in the container, the relative values of said first and second components of variable current being so related to the relationship between the dielectric constant and density of the fluid that a substantially accurate indication of said mass is obtained.

4. Capacitance type fluid measuring apparatus for indicating the mass of fluid in a container, the dielectric constant of the fluid being representative within predetermined tolerable limits of the density of the same fluid within the range of fluids to be measured, comprising in combination: a measuring condenser having spaced electrodes immersible in the fluid in the container and constructed and arranged with respect to said container such that its capacity is a function of both the volume and dielectric constant of the fluid in the container; a reference condenser having a normally fixed capacity; an auxiliary condenser having electrodes constructed and arranged for substantially complete immersion in a representative sample of the fluid such that its capacity is a function of the dielectric constant of the fluid in the container; a first source of alternating voltage of constant magnitude; circuit means connecting said measuring condenser to said first source of alternating voltage for producing a current of a first phase which is a function of the capacity of said measuring condenser; means for producing a current of a phase opposite to said current of a first phase, including a source of alternating voltage of a variable magnitude and of a phase opposite to said first source, circuit means connecting said reference condenser to said variable source of alternating voltage for producing a first component of variable current, substantially opposite in phase to said current of said first phase, and proportional to the magnitude of said variable source of voltage and circuit means coupling said auxiliary condenser to said variable source of voltage for providing a second component of variable current substantially in phase with said first variable component and proportional to both the magnitude of said variable source of voltage and to the capacitance value of said auxiliary condenser; means connected between a first output point common to said voltage sources and a second output point common to said measuring condenser, said reference condenser and said auxiliary condenser and responsive to any output voltage resulting from the current of said first phase and the current of said opposite phase, for adjusting the magnitude of said variable source of voltage in a direction to reduce said output voltage to zero and means responsive to the adjustment of said variable source of voltage for indicating the mass of fluid in the container, the relative values of said first and second components of variable current being so related to the relationship between the dielectric constant and density of the fluid that a substantially accurate indication of said mass is obtained.

5. Capacitor type measuring apparatus for use in providing an output which is a function of both the volume and the density of a fluid which is held in a container, the fluid being of a type in which variations in dielectric constant thereof bear a predetermined relationship to corresponding variations in the density of the fluid, the apparatus comprising; capacitor type measuring means having spaced electrodes and adapted to be positioned in the container of fluid to receive the fluid between said electrodes, the capacitance value of said measuring means being indicative of the volume of fluid within the container and of the dielectric constant of the fluid; a measuring reference capacitor; a dielectric constant compensating capacitor having spaced electrodes and arranged to have the space between its electrodes filled with the fluid so that the capacitance value of said compensating capacitor is indicative of the dielectric constant of the fluid, means connecting said dielectric compensation capacitor in parallel with said measuring reference capacitor; a first source of voltage of normally fixed magnitude, means connecting said capacitor type measuring means to said first source of voltage in a manner to derive a first signal of a first phase and of a magnitude indicative of the volume and dielectric constant of the fluid in the container; a second source of voltage of variable magnitude, means connecting said parallel connected dielectric compensation capacitor and measuring reference capacitor to said second source of voltage in a manner to derive a second signal of a second phase and of a magnitude which is a function of the magnitude of said second source of voltage and of the dielectric constant of the fluid; signal responsive comparing means connected to said capacitor type measuring means, said measuring reference capacitor and said dielectric compensation capacitor to have impressed thereon a resultant signal that is a function of said first and second signals, and means including output means connecting said comparing means to vary the magnitude of said second source of voltage and thereby to vary said second signal to reduce said resultant signal substantially to zero, said dielectric compensation capacitor and said measuring reference capacitor being so proportioned relative to each other that a change in dielectric constant of the fluid produces a resultant change in said second signal to at least partially correct for the corresponding change in density of the fluid.

6. Capacitor type measuring apparatus for use in providing an output which is a function at least in part of the density of a dielectric fluid which is stored in a tank, the apparatus comprising; capacitor type measuring means having spaced electrodes and arranged to be positioned in the tank of fluid, the capacitance value of said measuring means varying at least in part as a function of the dielectric constant of the fluid, the fluid being of a type in which variations in the dielectric constant thereof bear a predetermined known relationship to corresponding variations in the density of the fluid; a first source of alternating voltage of constant magnitude, means connecting said measuring means to said first source of voltage in a manner to obtain a first signal of a first phase; an empty tank reference capacitor, a second source of alternating voltage of constant magnitude, means connecting said empty tank reference capacitor to said second source of voltage in a manner to obtain a second signal of an opposite phase and equal in magnitude to that portion of said first signal which is indicative of an empty tank capacitance value of said measuring means; a dielectric compensation capacitor having spaced electrodes with the space therebetween arranged to be occupied by the fluid so that the capacitance value of said compensating capacitor varies as a function of the dielectric constant of the fluid; a measuring reference capacitor, means connecting said measuring reference capacitor in parallel with said compensation capacitor; a source of alternating voltage of variable magnitude, means connecting said parallel connecting measuring reference capacitor and compensation capacitor to said variable source of voltage in a manner to obtain a third signal of said opposite phase, the magnitude of said third signal being controlled in part by the dielectric constant of the fluid and thereby being variable with changes in dielectric constant, said dielectric compensation capacitor and said measuring reference capacitor being so proportioned that variations in the dielectric constant of the fluid cause variations in said third signal in accordance with the predetermined relationship by which the dielectric constant and the density of the fluid is known to vary; signal responsive comparing means connected to be responsive to a signal which is a resultant of said first, second, and third signals, and means including output means controlled by said comparing means to vary said source of variable alternating voltage and tend to reduce said resultant signal substantially to zero.

7. Capacitor type measuring apparatus for use in providing an output which is indicative of the mass of fluid which is stored in a container, the output being a function of both the volume and the density of the fluid, the fluid being of a type in which the variations in dielectric constant thereof bear a predetermined known relationship to corresponding variations in the density of the fluid so that measurement of dielectric constant may be utilized in a predetermined manner to obtain a close approximation to the density of the fluid, the apparatus comprising; capacitor type measuring means arranged to be positioned in the container of fluid and having a first and a second terminal and spaced electrodes, the capacitance value of said measuring means varying as the volume of fluid in the container varies and varying as the dielectric constant of this fluid varies; alternating voltage supply means having a point of reference potential, a point of fixed magnitude potential of a first phase with respect to said point of reference potential, and a point of fixed magnitude potential of a second phase with respect to said point of reference potential; means connecting said first terminal of said measuring means to said point of fixed magnitude potential of said first phase; an empty tank reference capacitor having a normally fixed capacitance value and having a first and a second terminal, means connecting said first terminal of said empty tank reference capacitor to said point of fixed magnitude potential of said second phase; a dielectric compensation capacitor having a first and a second terminal and having spaced electrodes, said compensation capacitor being arranged to be positioned so that the space between its electrodes is filled with the fluid, the capacitance value of said compensation capacitor varying as the dielectric constant of the fluid varies; a point of variable magnitude alternating potential of the second phase, means connecting said first terminal of said compensating capacitor to said point of variable magnitude potential; a measuring reference capacitor having a normally fixed capacitance value and having a first and a second terminal, means connecting said first terminal of said measuring reference capacitor to said point of variable magnitude potential; amplifier means having an input with a first and a second terminal and having an output; means connecting the said second terminals of said measuring means, said empty tank reference capacitor, said dielectric compensation capacitor, and said measuring reference capacitor to said first terminal of said amplifier means input; means connecting said second terminal of said amplifier means input to said point of reference potential whereby voltages are impressed across said measuring means and said capacitors and as a result thereof signal currents flow in the input circuit of said amplifier means with the signal current due to said empty tank reference capacitor neutralizing the signal current from said measuring means due to no fluid in the container, and the signal currents due to said dielectric compensation and measuring reference capacitors tending to neutralize the signal current from said measuring means due to fluid in the container, said dielectric compensation capacitor and said measuring reference capacitor being so proportioned that a variation in dielectric constant of the fluid causes a change in the signal current due to said dielectric compensation capacitor which when compared to the signal current due to said measuring reference capacitor is a function of the predetermined known relationship which exists between variations in dielectric constant and density of the fluid; reversible motor means, means connecting said motor means to said amplifier means output to be controlled thereby, indicator means controlled by said motor means, and means operated by said motor means to vary the magnitude of said point of variable magnitude potential to which the first terminals of said dielectric compensation and said measuring reference capacitors are connected.

8. Capacitance type fluid measuring apparatus for indicating the mass of fluid in a container, the dielectric constant of the fluid being representative within predetermined tolerable limits of the density of the same fluid within the range of fluids to be measured, comprising in combination: capacitor type measuring means having spaced electrodes immersible in the fluid in the container and constructed and arranged with respect to said container such that its capacitance value is a function of both the volume and the dielectric constant of the fluid in the container, a measuring reference impedance having a normally fixed impedance value, an empty tank balancing impedance; a dielectric constant compensation capacitor having spaced electrodes constructed and arranged for substantially complete immersion and a representative sample of the fluid such that its capacitance value is a function of the dielectric constant of the fluid in the container; a first source of constant magnitude alternating voltage, means connecting said measuring means to said source of constant magnitude voltage for producing a signal of a first phase which is a function of the capacitance value of said measuring means; a second source of constant magnitude alternating voltage; means connecting said empty tank balancing impedance to said second source of constant magnitude voltage for producing a signal of phase opposite to said signal of said first phase and of magnitude equal to the signal flowing through said measuring means when empty of fluid; means for producing a further signal of a phase opposite to said signal of said first phase, including a source of variable magnitude alternating voltage, circuit means connecting said measuring reference impedance to said variable source of alternating voltage for producing a first component of variable signal substantially opposite in phase to said signal of said first phase and proportional to the magnitude of said source of variable magnitude alternating voltage, and circuit means coupling said dielectric constant compensation capacitor to said source of variable magnitude alternating voltage for producing a second component of variable signal substantially in phase with said first variable component and proportional to both the magnitude of said variable magnitude source of alternating voltage and to the capacitance value of said dielectric constant compensation capacitor; means connected between a first output point common to said voltage sources and a second output point common to said measuring means, said measuring reference impedance, said dielectric constant compensation capacitor and said empty balancing impedance and responsive to any output signal resulting from the signal of said first phase and the signals of said opposite phase, for adjusting the magnitude of said variable magnitude source of alternating voltage in a direction to reduce said output signal substantially to zero, and means responsive to the adjustment of said variable magnitude source of alternating voltage for indicating the mass of fluid in the container, the relative value of said first and second components of variable signal being so related to the relationship between the dielectric constant and density of the fluid that a substantially accurate indication of said mass is obtained.

9. Capacitance type fluid measuring apparatus for providing an output which varies as a function of the mass of a fluid stored in a container, the dielectric constant of the fluid being representative within predetermined tolerable limits of the density of the same fluid within the range of fluids to be measured, comprising in combination: a capacitor type measuring means having spaced electrodes and constructed and arranged with respect to the container such that its capacitance value is a function of both the volume and the dielectric constant of the fluid in the container; a dielectric compensation capacitor having spaced electrodes constructed and arranged for substantially complete immersion in a representative sample of the fluid such that its capacitance value is a function of the dielectric constant of the fluid in the container; a measuring reference impedance; a first source of alternating voltage of constant magnitude; circuit means connecting said measuring means to said first source of alternating voltage for producing a signal of a first phase which is a function of the capacitance value of said measuring means; circuit means for producing a signal of a phase opposite to said first phase, including a source of alternating voltage of a variable magnitude, circuit means connecting said reference impedance to said variable source of voltage for producing a first component of variable signal substantially opposite in phase to said signal of said first phase and proportional to the magnitude of said variable source of voltage, and circuit means connecting said dielectric compensation capacitor to said variable source of voltage for producing a second component of variable signal substantially in phase with said first variable component and proportional both to the magnitude of said variable source of voltage and to the dielectric constant of the fluid; means connected between a first output point common to said voltage sources and a second output point common to said measuring means, said dielectric compensation capacitor and said measuring reference impedance and responsive to any output signal resulting from the signal of said first phase and the signal of said opposite phase, for adjusting the magnitude of said variable source of voltage in a direction to reduce said output signal substantially to zero, and means responsive to adjustment of said variable source of voltage for indicating the mass of fluid in the container, the relative values of said first and second components of variable signal being so related to the relationship between the dielectric constant and density of the fluid that a substantially accurate indication of said mass is obtained.

10. Capacitor type measuring apparatus for use in providing an output which is indicative of the mass of a fluid which is held in a tank, the output being a function of both the volume and the density of this fluid, and the fluid being of a type in which variations in dielectric constant bear a predetermined known relationship to corresponding variations in the density of the fluid such that variations in the dielectric constant may be utilized in a predetermined manner to be indicative of variations in the density of the fluid, the apparatus comprising; capacitor type measuring means having spaced electrodes constructed and arranged to be positioned in the tank containing the fluid and to have the dielectric fluid between said electrodes so that the capacitance value of said measuring means varies with a change in the volume of fluid in the tank and with a change in the dielectric constant of the fluid; a measuring reference capacitor having a fixed capacitance value; a dielectric compensation capacitor having spaced electrodes and arranged to be positioned to have the dielectric fluid between its electrodes at all times such that the capacitance value of said dielectric compensation capacitor varies with a change in the dielectric constant of the fluid; a first source of constant magnitude alternating voltage, means connecting said capacitor type measuring means to said first source of voltage to derive a signal of a first phase from said capacitor type measuring means; a second source of variable magnitude alternating voltage, means connecting said measuring reference capacitor to said second source of voltage to derive a signal of an opposite phase from said measuring reference capacitor and of a magnitude which is a function of the magnitude of said second source of voltage; signal responsive means connecting said measuring means and said measuring reference capacitor together such that the signals of said first and opposite phase are in opposition; a compensation circuit including said second source of voltage and said dielectric compensation capacitor, means connecting said compensation circuit to said signal responsive means to apply to said signal responsive means a further signal of said opposite phase and of a magnitude which is a function of the magnitude of said second source of voltage and of the dielectric constant of the fluid, said measuring reference capacitor and said dielectric compensation capacitor being so proportioned that said first signal of said opposite phase and said further signal of said opposite phase bear a predetermined relationship to each other, such that variations in dielectric constant of the fluid cause variations in said further signal as determined by the predetermined known relationship by which the dielectric constant and the density of the fluid are known to correspondingly vary; indicating means, means connecting said signal responsive means to said indicating means to provide an indication of the mass of fluid in the tank; and means connecting said signal responsive means to one of said voltage sources to vary at least one of said signals.

11. Capacitor type measuring apparatus for use in providing an output indicative of the mass of fluid in a container, the output being a function of both the volume and the density of the fluid in the container, and the dielectric fluid being of a type in which the variations in dielectric constant thereof bear a predetermined known relationship to corresponding variations in the density of the fluid so that the sensing of variations in the dielectric constant in a predetermined manner may be utilized as an indication of corresponding variations in the density of the fluid, the apparatus comprising; capacitor type measuring means having spaced electrodes constructed and arranged to be positioned in the container to receive the fluid between its electrodes so that its capacitance value depends upon the volume of fluid in the container and the dielectric constant of the fluid, a source of alternating voltage, measuring circuit means including said source of alternating voltage and said capacitor type measuring means having a first output signal of a first phase and of a magnitude dependent upon the volume of fluid in the container and the dielectric constant thereof; measuring reference capacitor means having a constant capacitance value, measuring reference circuit means including said source of alternating voltage and said measuring reference capacitor means having a second output signal of an opposite phase; a dielectric constant compensation capacitor having spaced electrodes and adapted to be positioned in the fluid so that its electrodes are at all times immersed in the fluid, the capacitance value of said dielectric constant compensation capacitor thereby varying as the dielectric constant of the fluid varies, compensation circuit means including said source of alternating voltage and said compensation capacitor having a third output signal of said opposite phase and of a magnitude dependent upon the dielectric constant of the fluid; said reference capacitor means and said compensation capacitor being so proportioned that a change in the dielectric constant of the fluid causes a change in the magnitude of said third output signal which is related to the magnitude of said second output signal in a predetermined manner as determined by the predetermined known relationship of corresponding variation in dielectric constant and density of the fluid, such that the change in the magnitude of said third signal is representative of the corresponding change in density of the fluid; signal responsive comparing means; means connecting the output signals of said measuring, reference, and compensation circuit means to said comparing means; means controlled by said comparing means for varying the output signal of at least one of said reference and compensation circuit means, and output means controlled by said voltage responsive comparing means in accordance with the mass of fluid in the container.

12. Capacitance type fluid measuring apparatus for use with a container holding a fluid, to obtain an output which is a function of the volume and of the density of the fluid, that is the mass of the fluid, the fluid being of the type in which the dielectric constant thereof bears a predetermined functional relationship with the density of the same fluid within predetermined limits, the apparatus comprising; a measuring condenser having spaced electrodes immersible in the fluid in the container and constructed and arranged with respect to the container such that its capacitance value is a function of both the volume and the dielectric constant of the fluid in the container; a first source of alternating voltage having a fixed magnitude;

posite phase for adjusting the magnitude of said variable source of voltage in a direction to reduce said output voltage to zero; and means responsive to the adjustment of said variable source of voltage for indicating the mass of fluid in the container, said rebalance condenser means being so chosen that the current therethrough varies with the relationship between the dielectirc constant and density of the fluid so that a substantially accurate indication of said mass is obtained.

16. Capacitance type fluid measuring apparatus for indicating the mass of fluid in a container, the dielectric constant of the fluid being representative within predetermined tolerable limits of the density of the same fluid within the range of fluids to be measured, comprising in combination: a measuring condenser having spaced electrodes immersible in the fluid in the container and constructed and arranged with respect to said container such that its capacity is a function of both the volume and dielectric constant of the fluid in the container; rebalance condenser means at least a portion of which is constructed and arranged for substantially complete immersion in a representative sample of the fluid such that the capacity of said rebalance condenser means varies with the dielectric constant of the fluid in the container; a first source of alternating voltage of constant magnitude; circuit means connecting said measuring condenser to said first source of alternating voltage for producing a current of a first phase which is a function of the capacity of said measuring condenser; means for producing a current of a phase opposite to said current of a first phase, including a source of alternating voltage of a variable magnitude and of a phase opposite to said first source; circuit means connecting said rebalance condenser means to said variable source of alternating voltage for producing a current, substantially opposite in phase to said current of said first phase, and proportional to both the magnitude of said variable source of voltage and to the capacitance value of said rebalance condenser means; means connected between a first output point common to said voltage sources and a second output point common to said measuring condenser and said rebalance condenser means and responsive to any output voltage resulting from the current of said first phase and the current of said opposite phase, for adjusting the magnitude of said variable source of voltage in a direction to reduce said output voltage to zero and means response to the adjustment of said variable source of voltage for indicating the mass of fluid in the container, said rebalance condenser means being so chosen that the current therethrough varies with the relationship between the dielectric constant and density of the fluid so that a substantially accurate indication of said mass is obtained.

References Cited in the file of this patent
UNITED STATES PATENTS

| | | |
|---|---|---|
| 2,188,628 | Freystedt | Jan. 30, 1940 |
| 2,300,562 | Freystedt | Nov. 3, 1942 |
| 2,541,743 | Brockman et al. | Feb. 13, 1951 |
| 2,563,280 | Schafer et al. | Aug. 7, 1951 |
| 2,563,281 | Griffith | Aug. 7, 1951 |
| 2,581,085 | Edelman | Jan. 1, 1952 |

FOREIGN PATENTS

| | | |
|---|---|---|
| 114,980 | Sweden | Sept. 18, 1945 |

OTHER REFERENCES

Airplane Fuel Gage, by Curtiss R. Schafer, published in Electronics, April 1950, vol. 23, issue No. 4, pages 77–79. (Photostatic copy in Div. 36, U.S. Patent Office 73–304.)

"Radiotron Designer's Handbook," edited by F. Langford-Smith, reproduced and distributed by Tube Div. Radio Corp. of America, fourth edition, 1952 (chap. 7, p. 306).

"Electronic Fundamentals and Applications," by John Dryder, published by Prentice-Hall, copyright 1950, 1954 (pp. 272–283).